US012706701B2

(12) United States Patent
Fu

(10) Patent No.: US 12,706,701 B2
(45) Date of Patent: Aug. 11, 2026

(54) HARQ FEEDBACK METHOD AND DEVICE, AND STORAGE MEDIUM

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 333 days.

(21) Appl. No.: 18/258,963

(22) PCT Filed: Dec. 24, 2020

(86) PCT No.: PCT/CN2020/139151
§ 371 (c)(1),
(2) Date: Jun. 22, 2023

(87) PCT Pub. No.: WO2022/133948
PCT Pub. Date: Jun. 30, 2022

(65) Prior Publication Data

US 2024/0048291 A1 Feb. 8, 2024

(51) Int. Cl.
*H04L 1/1829* (2023.01)
*H04W 74/0816* (2024.01)

(52) U.S. Cl.
CPC ....... *H04L 1/1854* (2013.01); *H04W 74/0816* (2013.01)

(58) Field of Classification Search
None
See application file for complete search history.

(56) References Cited

U.S. PATENT DOCUMENTS

2020/0313803 A1 10/2020 Khoshnevisan et al.
2022/0070922 A1* 3/2022 Talarico ............ H04W 72/1268
2023/0354275 A1* 11/2023 Moon .............. H04W 74/0808

FOREIGN PATENT DOCUMENTS

CN 110830174 A 2/2020
CN 111294168 A 6/2020
CN 111435901 A 7/2020
WO 2019216619 A1 11/2019
WO 2020097218 A1 5/2020

OTHER PUBLICATIONS

"On Channel Access Procedure," Proceedings of the 3GPP TSG RAN WG1 #96bis, MediaTek Inc., R1-1904482, Apr. 8, 2019, Xi'an, China, 13 pages.

* cited by examiner

*Primary Examiner* — Yaotang Wang
(74) *Attorney, Agent, or Firm* — McCoy Russell LLP

(57) ABSTRACT

An HARQ feedback method, performed by a terminal, includes: obtaining a first determination result by determining whether a target time domain position for sending HARQ feedback information is located within a first channel occupancy time (COT) where a target physical downlink shared channel (PDSCH) transmitted by a base station is located, where the HARQ feedback information is HARQ feedback information corresponding to the target PDSCH; and based on the first determination result, determining a target COT associated with the target time domain position.

15 Claims, 4 Drawing Sheets

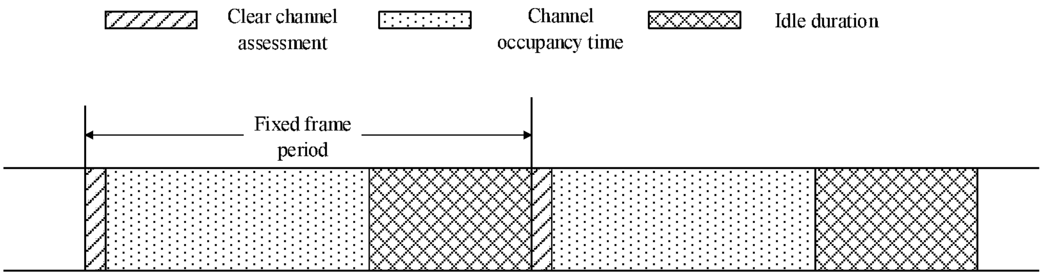
Fig. 1
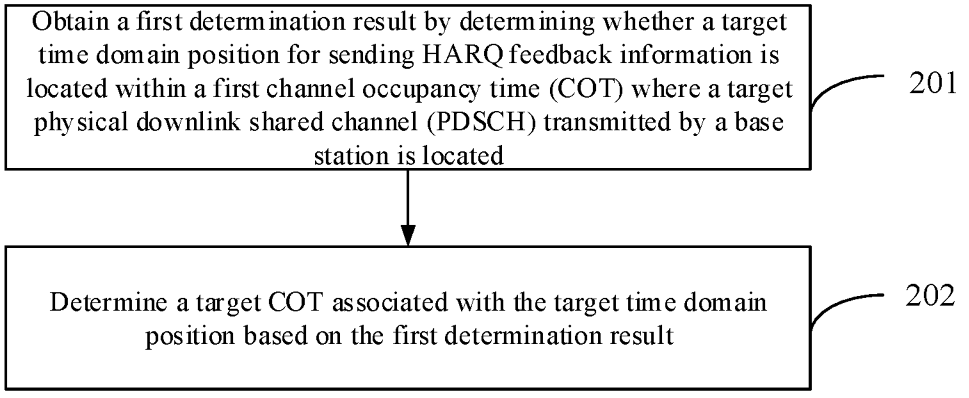
Fig. 2
Take, in response to a first determination result indicating that a target time domain position is located within a first COT, the first COT as a target COT
301
Fig. 3

Figures 4, 5:
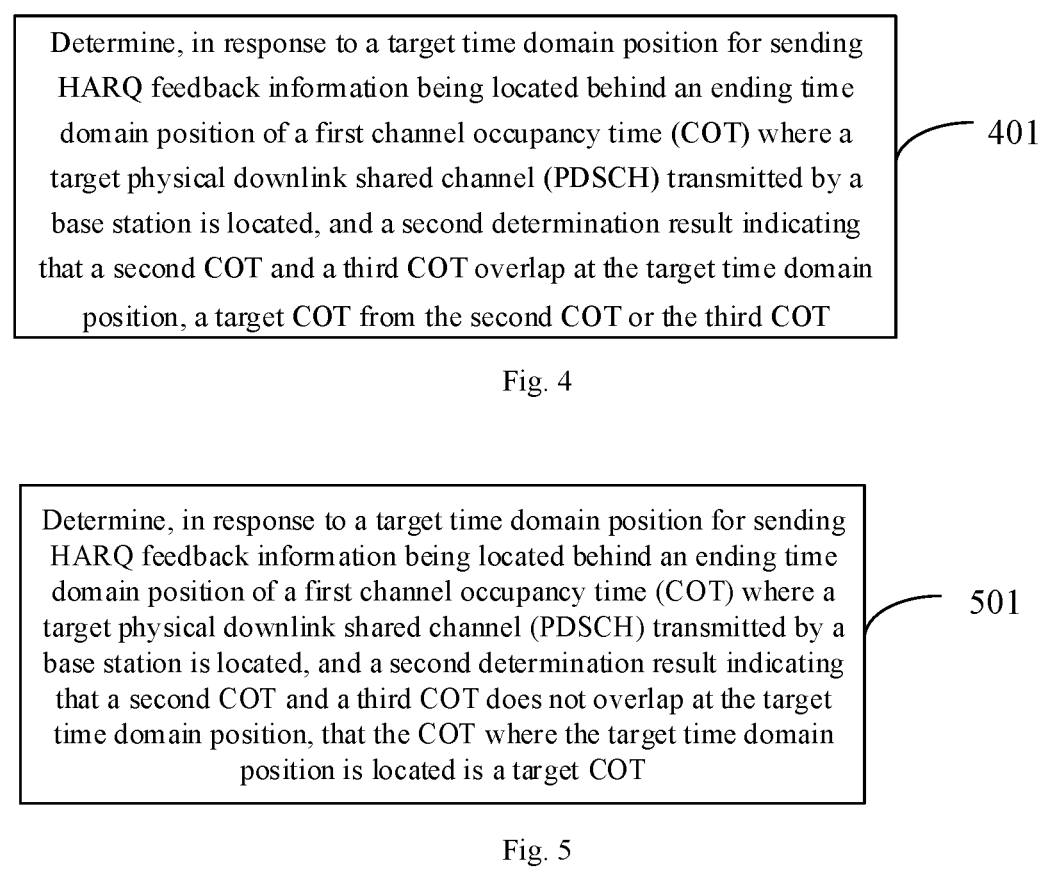

Determine, in response to a target time domain position for sending HARQ feedback information being located behind an ending time domain position of a first channel occupancy time (COT) where a target physical downlink shared channel (PDSCH) transmitted by a base station is located, and a second determination result indicating that a second COT and a third COT overlap at the target time domain position, a target COT from the second COT or the third COT

Determine, in response to a target time domain position for sending HARQ feedback information being located behind an ending time domain position of a first channel occupancy time (COT) where a target physical downlink shared channel (PDSCH) transmitted by a base station is located, and a second determination result indicating that a second COT and a third COT does not overlap at the target time domain position, that the COT where the target time domain position is located is a target COT

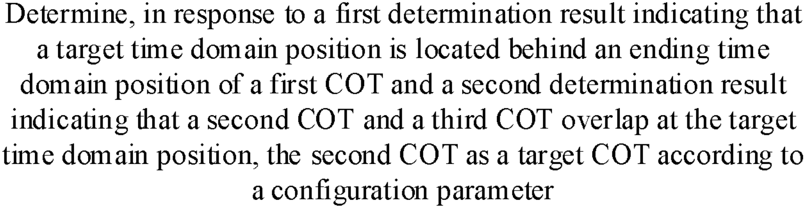
Fig. 6
Determine, in response to a first determination result indicating that a target time domain position is located behind an ending time domain position of a first COT, a third COT as a target COT according to a first signaling sent by a base station
701
Fig. 7
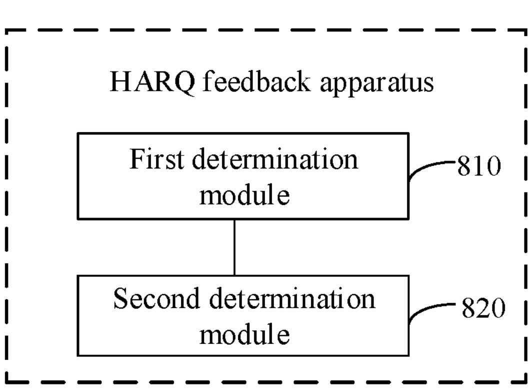
Fig. 8

HARQ FEEDBACK METHOD AND DEVICE, AND STORAGE MEDIUM

CROSS REFERENCE TO RELATED APPLICATION

The present application is a U.S. National Phase of International Application No. PCT/CN2020/139151 entitled "HARQ FEEDBACK METHOD AND DEVICE, AND STORAGE MEDIUM," and filed on Dec. 24, 2020. The entire contents of the above-listed application are hereby incorporated by reference for all purposes.

BACKGROUND

On an unauthorized spectrum, a transmitting terminal generally needs to monitor a channel before sending data by taking up the channel, that is, clear channel assessment (CCA). If determining that the channel is idle after performing the CCA, the transmitting terminal can send the data by occupying the channel, a maximum channel occupancy time (MCOT) is specified by a protocol or is configured/instructed by a base station, or otherwise, the channel cannot be occupied. The above process is generally called a channel access mechanism of listen before talk (LBT) on an unauthorized frequency band.

Frame-based equipment (FBE) and load-based equipment (LBE) may be classified according to different LBT modes. The FBE is a channel detection and access mechanism with a fixed frame period (FFP).

SUMMARY

A first aspect of the examples of the disclosure provides a hybrid automatic repeat request (HARQ) feedback method, including:

- obtaining a first determination result by determining whether a target time domain position for sending HARQ feedback information is located within a first channel occupancy time (COT) where a target physical downlink shared channel (PDSCH) transmitted by a base station is located, where the HARQ feedback information is HARQ feedback information corresponding to the target PDSCH; and
- determining a target COT associated with the target time domain position based on the first determination result.

A second aspect of the examples of the disclosure provides a non-transitory computer readable storage medium, the storage medium stores a computer program, and the computer program when being executed, is configured to perform the HARQ feedback method according to any one of the first aspect.

A third aspect of the examples of the disclosure provides an HARQ feedback device which includes:

- a processor; and
- a memory configured to store executable instructions of the processor.

The processor, when the instructions being executed, is configured to perform the HARQ feedback method according to any one of the first aspect.

It should be understood that general descriptions above and detailed descriptions below are illustrative and explanatory only and do not limit the disclosure.

BRIEF DESCRIPTION OF THE DRAWINGS

The accompanying drawings here are incorporated into the description and form part of the description, show examples that comply with the disclosure and are used to explain principles of the examples of the disclosure together with the description.

FIG. 1 is a schematic diagram of an FBE period configuration shown according to an example.

FIG. 2 is a schematic flow diagram of an HARQ feedback method shown according to an example.

FIG. 3 is another schematic flow diagram of an HARQ feedback method shown according to an example.

FIG. 4 is another schematic flow diagram of an HARQ feedback method shown according to an example.

FIG. 5 is another schematic flow diagram of an HARQ feedback method shown according to an example.

FIG. 6 is another schematic flow diagram of an HARQ feedback method shown according to an example.

FIG. 7 is another schematic flow diagram of an HARQ feedback method shown according to an example.

FIG. 8 is a block diagram of an HARQ feedback apparatus shown according to an example.

DETAILED DESCRIPTION

Figure 9:
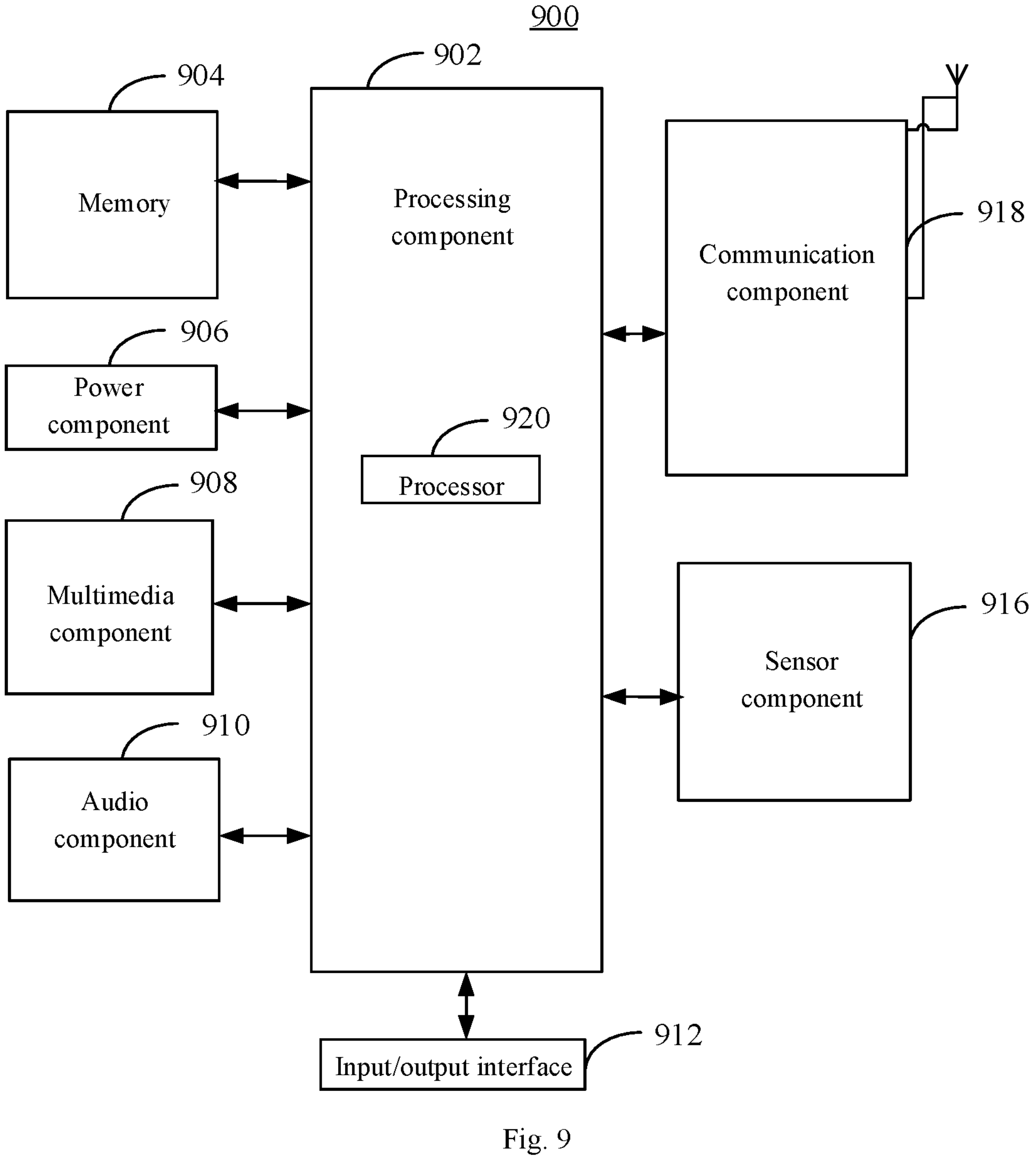
FIG. 9 is another schematic structural diagram of an HARQ feedback apparatus shown according to an example of the disclosure.

Examples will be illustrated in details here, which are shown in the accompanying drawings. When the descriptions below relate to the accompanying drawings, the same numbers in different accompanying drawings indicate the same or similar elements unless otherwise indicated. The implementations described in the following examples do not represent all implementations consistent with the disclosure. On the contrary, they are examples of apparatuses and methods that are consistent with some aspects of the disclosure as detailed in the attached claims.

Terms used in the disclosure are for the purpose of describing specific examples and are not aimed to limit the disclosure. Words "one", "said" and "the" in a singular form used in the disclosure and the appended claims are also aimed at including a plural form, unless the context clearly shows other meanings. It shall also be understood that terms "and/or" used in the disclosure refer to and include any or all possible combinations of one or more relevant listed items.

It shall be understood that although terms of first, second, third, and the like may be adopted to describe various pieces of information in the disclosure, these pieces of information are not limited to the terms. The terms are used to distinguish the same type of information from one another. For example, under the condition of not departing from the scope of the disclosure, first information also may be called second information, and similarly, the second information also may be called the first information. Depending on the context, for example, the word "if" used here may be explained as "at the time of" or "when" or "in response to determining".

The disclosure relates to the field of communications, in particular to an HARQ feedback method, an HARQ feedback apparatus and a storage medium.

FBE parameters for downlink transmission of a base station and uplink transmission of a terminal can be configured by the base station, and the parameters includes but not limited to an FBE period, an offset (the offset of a starting sub-frame for the CCA relative to a sub-frame numbered 0), an idle duration, and the like. In some configuration conditions, a COT duration of an FBE configuration for downlink transmission of the base station may overlap a COT duration of an FBE configuration for uplink transmission of a user equipment (UE) in a time domain.

In the case that both the base station and the terminal have FBE configurations and COT durations of the base station and the terminal overlap in the time domain, if a base station scheduling terminal performs hybrid automatic repeat request (HARQ) feedback within an overlap period, the terminal cannot determine whether the HARQ feedback transmission is associated with the FFP configuration of the base station or with the FFP configuration of the terminal.

In order to solve problems in related art, examples of the disclosure provide an HARQ feedback method, an HARQ feedback method apparatus and a storage medium.

Before introducing a solution of hybrid automatic repeat request (HARQ) feedback provided by the disclosure, an LBT mode of FBE in the related art is first introduced. Referring to FIG. 1, taking an FBE period being 10 milliseconds as an example, in the case that a transmitting terminal needs to send data, channel detection may be performed every 10 milliseconds. Through CCA, after a channel is determined to be accessed, data sending is performed within COT, and certainly, a maximum duration of data transmission cannot exceed MCOT. In addition, in each period, after the MCOT ends, an idle duration is needed, and in the idle duration, the transmitting terminal cannot send the data.

An example of the disclosure provides an HARQ feedback method, which may be performed by a terminal. Referring to FIG. 2, a flow diagram of the HARQ feedback method is shown according to an example, and the method may include the following steps:

in step 201, a first determination result is obtained by determining whether a target time domain position for sending HARQ feedback information is located within a first channel occupancy time (COT) where a target physical downlink shared channel (PDSCH) transmitted by a base station is located.

In the example of the disclosure, the HARQ feedback information is HARQ feedback information corresponding to the target physical downlink shared channel (PDSCH), and the base station may indicate, through the target PDSCH, the terminal to transmit the target time domain position of the HARQ feedback information. The terminal may determine whether the target time domain position is located within the first COT where the target PDSCH is located.

In step 202, the target COT associated with the target time domain position is determined based on the first determination result.

In the above example, the terminal may determine the target COT associated with the target time domain position based on whether the target time domain position for sending the HARQ feedback information is located within the first COT where the target PADSCH transmitted by the base station is located, and thus has high availability.

The disclosure further provides an HARQ feedback method. Referring to FIG. 3, another flow diagram of the HARQ feedback method is shown according to an example, and the method may include the following steps:

in step 301, in response to the first determination result indicating that the target time domain position is located within the first COT, the first COT is taken as the target COT.

In the example of the disclosure, the terminal may directly take the first COT as the target COT associated with the target time domain position in the case that the target time domain position for sending the HARQ feedback information is located within the first COT where the target PDSCH is located.

Correspondingly, the terminal may directly send the HARQ feedback information at the target time domain position, and the terminal does not need CCA detection.

In the examples of the disclosure, the terminal may directly take the first COT as the target COT in the case that the target time domain position is determined to be located within the first COT, and send the HARQ feedback information at the target time domain position. Thus, the terminal does not need CCA detection and has high availability.

Those skilled in the art may understand that the technical solution in step 301 may be independently implemented and may also be implemented together with any one of other technical solutions in the examples of the disclosure, and the examples of the disclosure do not make limitation for this.

The disclosure further provides an HARQ feedback method. Referring to FIG. 4, another flow diagram of the HARQ feedback method is shown according to an example, and the method may include the following steps:

in step 401, in response to the target time domain position for sending the HARQ feedback information being located behind an ending time domain position of the first channel occupancy time (COT) where the target physical downlink shared channel (PDSCH) transmitted by the base station is located, and the second determination result indicating that the second COT and the third COT overlap at the target time domain position, the target COT is determined from the second COT or the third COT.

In the example of the disclosure, when the target time domain position is located behind the ending time domain position of the first COT, that is, the target time domain position for sending the HARQ feedback information is not within the first COT, the terminal may determine whether the second COT and the third COT overlap at the target time domain position.

The second COT refers to a COT which is obtained on the basis of an FBE parameter corresponding to downlink transmission of the base station, that is, the second COT is the COT corresponding to the base station. The third COT refers to a COT which is obtained on the basis of an FBE parameter corresponding to uplink transmission of the terminal, that is, the third COT is the COT corresponding to the terminal.

In the example of the disclosure, the second COT or the third COT may be taken as the COT associated with the target time domain position in the case that the second COT and the third COT overlap at the target time domain position. That is, the target time domain position is associated with the COT corresponding to the base station or the COT corresponding to the terminal.

In the above example, the terminal may associate the target time domain position to the second COT or the third COT based on whether the second COT and the third COT overlap at the target time domain position in the case that the target time domain position is determined to be located behind the ending time domain position of the first COT. Thus, the aim of determining the target COT associated with the target time domain position can be achieved and the availability is high.

The example of the disclosure further provides an HARQ feedback method. Referring to FIG. 5, another flow diagram of an HARQ feedback method is shown according to an example, and the method includes:

in step 501, in response to the target time domain position for sending the HARQ feedback information being located behind the ending time domain position of the first channel occupancy time (COT) where the target physical downlink shared channel (PDSCH) transmitted by the base station is located, and the second determination result indicating that the second COT and the third COT does not overlap at the target time domain position, the COT where the target time domain position is located is determined as the target COT.

In one example, the target time domain position is located in the second COT, and the terminal may directly take the second COT as the target COT.

In another example, the target time domain position is located in the third COT, and the terminal may directly take the third COT as the target COT.

In the above example, in the case that the COT corresponding to the base station and the COT corresponding to the terminal does not overlap at the target time domain position, the COT in which the target time domain position is located may be taken as the target COT, which has high availability.

The example of the disclosure further provides an HARQ feedback method. Referring to FIG. 6, another flow diagram of the HARQ feedback method shown according to an example, and the method may include the following steps:

in step 601, in response to the first determination result indicating that the target time domain position is located behind the ending time domain position of the first COT and the second determination result indicating that the second COT and the third COT overlap at the target time domain position, the second COT is determined as the target COT according to a configuration parameter.

The second COT refers to the COT obtained on the basis of the FBE parameter corresponding to downlink transmission of the base station, that is, the second COT is the COT corresponding to the base station.

In some examples of the disclosure, the configuration parameter may be an indication of a first signaling sent by the base station. In the example of the disclosure, the first signaling may be a high-level signaling and includes but is not limited to a radio resource control (RRC) signaling, a media access control address (MAC) signaling, and the like.

In some examples of the disclosure, the configuration parameter may be a pre-configuration parameter. In the example of the disclosure, predefined setting includes but is no limited to an agreement.

In some examples of the disclosure, the configuration parameter may be an indication of target downlink control information (DCI), and the second COT or the third COT is taken as the target COT. In the example of the disclosure, the target DCI may be scheduling DCI for scheduling the target PDSCH. When the target time domain position for sending the HARQ feedback information is located behind the ending time domain position of the first COT where the target PDSCH is located, the terminal may take the second COT as the target COT according to the indication of the target DCI sent by the base station in the case that the second COT and the third COT overlap at the target time domain position. In the above example, the terminal may take the second COT or the third COT as the target COT according to the indication of the target DCI in the case of determining an association relationship between the target COT and the target time domain position for operating the indication of the target DCI according to the second signaling sent by the base station, which has high availability.

In the examples of the disclosure, the terminal may associate the target time domain position with the second COT or the third COT according to the indication of the target DCI sent by the base station in the case that the second COT and the third COT overlap at the target time domain position. Thus, the aim of determining the target COT associated with the target time domain position can be achieved and the availability is high.

In some optional examples, in the case that the target PDSCH is a semi-continuously scheduled PDSCH, the target DCI is configured to activate the semi-continuously scheduled target PDSCH.

In the above example, the target DCI may further be active DCI for activating the semi-continuously scheduled target PDSCH, and the terminal may take the COT corresponding to the base station or the COT corresponding to the terminal as the target COT associated with the target time domain position for sending the HARQ feedback information according to the indication of the target DCI, which saves signaling resources of the base station and has high availability.

In some examples of the disclosure, the configuration parameter may be the second COT or the third COT as the target COT according to the specific time domain position of the HARQ-ACK physical uplink control channel (PUCCH). In an example, if the starting time of a channel for transmitting HARQ-ACK information is just right at the start position of the second COT, the target time domain position is associated with the second COT, or otherwise is associated with the third COT.

Referring to FIG. 7, another flow diagram of an HARQ feedback method is shown according to an example, and the method may include the following steps:

in step 701, in response to the first determination result indicating that the target time domain position is located behind the ending time domain position of the first COT, the third COT is determined as the target COT according to the first signaling sent by the base station.

The third COT refers to the COT obtained on the basis of the FBE parameter corresponding to uplink transmission of the terminal, that is, the third COT is the COT corresponding to the terminal.

In the example of the disclosure, the first signaling may be the high-level signaling and includes but is not limited to the radio resource control (RRC) signaling and the media access control address (MAC) signaling.

In the examples of the disclosure, the terminal may associate the target time domain position with the second COT or the third COT according to the indication of the first signaling sent by the base station in the case that the second COT and the third COT overlap at the target time domain position. Thus, the aim of determining the target COT associated with the target time domain position can be achieved and the availability is high.

The example of the disclosure provides the HARQ feedback method, the terminal may take the second COT or the third COT as the target COT according to the indication of the target DCI in the case of determining that the base station allows the target DCI to indicate the association relationship between the target time domain position and the target COT according to the second signaling sent by the base station in the case that the target time domain position for sending the HARQ feedback information is located behind the ending time domain position of the first COT where the target PDSCH is located and that the second COT and the third COT overlap at the target time domain position. In the example of the disclosure, the second signaling includes but is not limited to the RRC signaling.

In some optional examples, the terminal may determine the second COT or the third COT as the target COT by itself according to the target time domain position for sending the HARQ feedback information.

In one example, the terminal may take the third COT as the target COT in the case that the starting time of the target time domain position is the same as the starting time domain position of the third COT, that is, the COT corresponding to the terminal is taken as the target COT. The terminal may take the COT corresponding to the base station, that is, the second COT as the target COT in the case that the starting time of the target time domain position is different from the starting time domain position of the third COT.

In the above example, the terminal may associate the target time domain position to the second COT or the third COT according to the target time domain position for sending the HARQ feedback information in the case that the second COT and the third COT overlap at the target time domain position. Thus, the aim of determining the target COT associated with the target time domain position can be achieved and the availability is high.

In the above example, the channel for sending the HARQ feedback information by the terminal may include but is not limited to the PUCCH or a physical uplink shared channel (PUSCH).

In some optional examples, the terminal may directly send the HARQ feedback information at the target time domain position in the second COT in the case that the terminal takes the second COT as the target COT, that is, the terminal takes the COT corresponding to the base station as the target COT, and does not need the CCA detection.

In an example, the base station may stop downlink sending in the period of sending the HARQ feedback information.

To ensure successfully occupation of the channel, the terminal may continuously occupy the channel from the starting time domain position of the third COT in the case that the terminal takes the third COT as the target COT, that is, the terminal takes the COT corresponding to the terminal itself as the target COT, so as to be conveniently able to send the HARQ feedback information to the base station at the target time domain position. In an example, an interval from the starting time domain position of the third COT to the target time domain position of the third COT may be padded through a padding signal, so as to ensure that the terminal occupies the channel all the time before sending the HARQ feedback information.

In the above example, different actions are executed according to whether the terminal is associated with the COT corresponding to the base station or the COT corresponding to the terminal itself in the case that the target time domain position for sending the HARQ feedback information is located behind the ending time domain position of the first COT and the second COT and the third COT overlap at the target time domain position, so that the HARQ feedback information is sent to the base station at the target time domain position, which has high availability.

The example of the disclosure further provides an HARQ feedback method, and the HARQ feedback solution provided by the disclosure may also be used in a scenario where objects are directly connected.

A receiving terminal determines whether the target time domain position for sending the HARQ feedback information is located within the first COT where a target channel transmitted by a transmitting terminal is located. The target channel includes but is not limited to a channel for performing HARQ feedback indicated by the transmitting terminal for the receiving terminal.

The receiving terminal may take the first COT as the target COT in the case of determining that the target time domain position is located within the first COT.

Furthermore, the receiving terminal may take the second COT or the third COT as the target COT in the case that the target time domain position is determined to be located behind the ending time domain position of the first COT and that the second COT and the third COT overlap at the target time domain position. The second COT may be the COT corresponding to the transmitting terminal and the third COT may be the COT corresponding to the receiving terminal in the scenario of direct connection between objects.

In the example of the disclosure, the receiving terminal may take the second COT or the third COT as the target COT according to the indication of the high-level signaling of the base station or predefined setting.

Or, the receiving terminal may take the second COT or the third COT as the target COT according to scheduling indication information sent by the base station including but not limited to the DCI.

Or, the receiving terminal may take the second COT or the third COT as the target COT according to the target time domain position for sending the HARQ feedback information.

The receiving terminal may directly send the HARQ feedback information at the target time domain position in the case of taking the second COT as the target COT, and does not need to perform CCA detection. Or, the terminal may begin to occupy the channel at the starting time domain position of the third COT in the case of taking the third COT as the target COT, so as to ensure that the HARQ feedback information may be set at the target time domain position.

In the examples of the disclosure, the terminal may associate the target time domain position with the second COT or the third COT according to the predefined setting in the case that the second COT and the third COT overlap at the target time domain position. Thus, the aim of determining the target COT associated with the target time domain position can be achieved and the availability is high.

In the above example, in the Internet of Things, under the scenario of direct connection between the objects, the terminal may determine the target COT associated with the target time domain position according to whether the target tine domain position for sending the HARQ feedback information is located within the first COT where the target channel is located case by case, so as to send the HARQ feedback information, which has high availability.

Corresponding to the above examples of the application function realization method, the disclosure further provides an example of an application function realization apparatus.

Referring to FIG. 8, FIG. 8 is a block diagram of an HARQ feedback apparatus shown according to an example. The apparatus is applied to a terminal, including:

- a first determination module 810, configured to obtain a first determination result by determining whether a target time domain position for sending HARQ feedback information is located within a first channel occupancy time (COT) where a target physical downlink shared channel (PDSCH) transmitted by a base station is located, where the HARQ feedback information is HARQ feedback information corresponding to the target PDSCH; and
- a second determination module 820, configured to determine a target COT associated with the target time domain position based on the first determination result.

In an example, the second determination module includes:

a first determination submodule, configured to, in response to the first determination result indicating that the target time domain position is located within the first COT, take the first COT as the target COT.

In an example, the second determination module further includes:

a second determination submodule, configured to, in response to the first determination result indicating that the target time domain position is located behind an ending time domain position of the first COT, obtain a second determination result by determining whether a second COT and a third COT overlap at the target time domain position, where the second COT is a COT obtained on the basis of a frame-based equipment (FBE) parameter corresponding to downlink transmission of the base station, and the third COT is a COT obtained on the basis of an FBE parameter corresponding to uplink transmission of the terminal; and a third determination submodule, configured to, in response to the second determination result indicating that the second COT and the third COT overlap at the target time domain position, take the second COT or the third COT as the target COT.

In an example, the third determination submodule includes:

a first determination unit, configure to take the second COT or the third COT as the target COT based on an indication of a first signaling sent by the base station.

In an example, the third determination submodule includes:

a second determination unit, configured to take the second COT or the third COT as the target COT based on predefined setting.

In an example, the third determination submodule includes:

a third determination unit, configured to take the second COT or the third COT as the target COT according to an indication of target downlink control information (DCI) sent by the base station, where the target DCI is DCI for scheduling the target PDSCH.

In an example, the third determination unit includes:

a determination subunit, configured to, in response to a second signaling sent by the base station, determine that the target DCI is allowed to indicate an association relationship between the target time domain position and the target COT and then take the second COT or the third COT as the target COT according to the indication of the target DCI.

In an example, the target PDSCH is a semi-continuously scheduled PDSCH, and the target DCI is configured to activate the semi-continuously scheduled target PDSCH.

In an example, the third determination submodule includes:

a fourth determination unit, configured to, in response to determining that starting time of the target time domain position is the same as a starting time domain position of the third COT, take the third COT as the target COT, and otherwise take the second COT as the target COT.

As apparatus examples basically correspond to method examples, relevant points refer to partial description of the method examples. The apparatus examples described above are schematic, where units described above as separate parts may or may not be physically separate, and parts shown as units may or may not be physical units, that is, may be located in one place or may also be distributed to a plurality of network units. Parts or all modules may be selected according to actual needs to realize the purpose of the solutions of the disclosure. Those ordinary skilled in the art may understand and implement the examples without creative labor.

Correspondingly, the disclosure further provides a non-transitory computer readable storage medium, the storage medium stores a computer program, and the computer program, when being executed, is configured to perform any one of the HARQ feedback method on a terminal side.

Correspondingly, the disclosure further provides an HARQ feedback device including:

a processor; and a memory configured to store executable instructions of the processor.

The processor, when the instructions being executed, is configured to perform any one of the HARQ feedback method on the terminal side.

FIG. 9 is a block diagram of an electronic device 900 shown according to an example. For example, the electronic device 900 may be a mobile phone, a tablet computer, an ebook reader, a multimedia playing device, a wearable device, a vehicle terminal, an ipad, a smart television and other terminals.

Referring to FIG. 9, the electronic device 900 may include one or more of following components: a processing component 902, a memory 904, a power component 906, a multimedia component 908, an audio component 910, an input/output (I/O) interface 912, a sensor component 916, and a communication component 918.

The processing component 902 typically controls the overall operation of the electronic device 900, such as operation associated with display, telephone call, data communication, camera operation, and recording operation. The processing component 902 may include one or more processors 920 to execute instructions to complete all or part of the steps of the above HARQ feedback method. In addition, the processing component 902 may include one or more modules to facilitate interactions between the processing component 902 and other components. For example, the processing component 902 may include a multimedia module to facilitate the interaction between the multimedia component 908 and the processing component 902. For another example, the processing component 902 may read an executable instruction from the memory, so as to perform steps of the HARQ feedback method provided by each example.

The memory 904 is configured to store various types of data to support operation on the electronic device 900. Examples of such data include instructions for any application program or methods operating on the electronic device 900, contact data, phone book data, messages, pictures, videos, and the like. The memory 904 may be implemented by any type of volatile or non-volatile storage device or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optical disc.

The power component 906 provides power to the various components of the electronic device 900. The power component 906 may include a power management system, one or more power supplies, and other components associated with generating, managing, and distributing power for the electronic device 900.

The multimedia component 908 includes a screen providing an output interface between the electronic device 900 and a user. In some examples, the multimedia component

908 includes a front camera and/or a rear camera. When the electronic device 900 is in an operation mode, such as a shooting mode or video mode, the front camera and/or the rear camera may receive external multimedia data. Each front camera and each rear camera may be a fixed optical lens system or have focal length and optical zoom capability.

The audio component 910 is configured to output and/or input audio signals. For example, the audio component 910 includes a microphone (MIC) that is configured to receive external audio signals when the electronic device 900 is in an operational mode, such as a call mode, a recording mode, and a speech recognition mode. The received audio signals may be further stored in the memory 904 or sent via the communication component 918. In some examples, the audio component 910 also includes a speaker for the output of the audio signals.

The I/O interface 912 provides an interface between the processing component 902 and a peripheral interface module, and the peripheral interface module may be a keyboard, a click wheel, buttons, and the like. These buttons may include, but are not limited to a home button, a volume button, a start button, and a lock button.

The sensor component 916 includes one or more sensors configured to provide a status assessment of all aspects of the electronic device 900. For example, the sensor component 916 may detect an on/off state of the electronic device 900, and relative positioning of the components, for example, the component is a display and a keypad of the electronic device 900, and the sensor component 916 may also detect the change in the position of the electronic device 900 or one of the components of the electronic device 900, presence or absence of contact between the user and the electronic device 900, an orientation or acceleration/deceleration of the electronic device 900 and a temperature change of the electronic device 900. The sensor component 916 may include a proximity sensor configured to detect presence of nearby objects without any physical contact. The sensor component 916 may also include an optical sensor, such as a CMOS or CCD image sensors, configured to be used in imaging applications. In some examples, the sensor component 916 may also include an acceleration sensor, a gyroscope sensor, a magnetic sensor, a pressure sensor or a temperature sensor.

The communication component 918 is configured to facilitate wired or wireless communication between the electronic device 900 and other devices. The electronic device 900 may access a wireless network based on a communication standard, such as WiFi, 2G, 3G, 4G, 5G, or 6G or a combination of the above. In an example, the communication component 918 receives broadcast signals or broadcast-related information from an external broadcast management system via a broadcast channel. In an example, the communication component 918 also includes a near-field communication (NFC) module to promote short-range communication. For example, the NFC module may be realized based on a radio frequency identification (RFID) technology, an infrared data association (IrDA) technology, an ultra wideband (UWB) technology, a Bluetooth (BT) technology and other technologies.

In an example, the electronic device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, configured to perform the above HARQ feedback method.

In an example, a non-transitory computer readable storage medium including instructions is also provided, such as a memory 904 including the instructions, and the above instructions may be executed by a processor 920 of the electronic device 900 to complete the above HARQ feedback method. For example, the non-transitory computer readable storage medium may be an ROM, a random access memory (RAM), a CD-ROM, a magnetic tape, a floppy disk, an optical data storage device, and the like.

After considering the specification and the practice of the invention disclosed here, those skilled in the art will easily think out other implementation schemes of the disclosure. The present application is intended to cover any variation, use or adaptive changes of the disclosure, and these variation, use or adaptive changes follow general principles of the disclosure and include common knowledge or customary technical means in the technical field not disclosed in the disclosure. The specification and the examples are regarded as examples, and the true scope and the spirit of the disclosure are indicated by the claims below.

It should be understood that the disclosure is not limited to a precise structure already described above and shown in the accompanying drawings and various modifications and changes may be performed without departing from the scope of the disclosure. The scope of the disclosure is limited by the appended claims.

What is claimed is:

1. A hybrid automatic repeat request (HARQ) feedback method, comprising:

obtaining a first determination result by determining whether a target time domain position for sending HARQ feedback information is located within a first channel occupancy time (COT) where a target physical downlink shared channel (PDSCH) transmitted by a base station is located, wherein the HARQ feedback information is HARQ feedback information corresponding to the target PDSCH; and determining a target COT associated with the target time domain position based on the first determination result;

wherein determining the target COT associated with the target time domain position based on the first determination result comprises:

taking, in response to the first determination result indicating that the target time domain position is located behind an ending time domain position of the first COT, a second COT or a third COT as the target COT, wherein the second COT is obtained based on a frame-based equipment (FBE) parameter corresponding to downlink transmission of the base station, and the third COT is obtained based on an FBE parameter corresponding to uplink transmission of a terminal, and the second COT and the third COT overlap at the target time domain position; and wherein taking the second COT or the third COT as the target COT comprises:

taking, in response to determining that a starting time of the target time domain position is the same as a starting time domain position of the third COT, the third COT as the target COT, or otherwise taking the second COT as the target COT.

2. The HARQ feedback method according to claim 1, wherein determining the target COT associated with the target time domain position based on the first determination result comprises:

taking, in response to the first determination result indicating that the target time domain position is located within the first COT, the first COT as the target COT.

3. The HARQ feedback method according to claim 1, wherein taking the second COT or the third COT as the target COT comprises:

taking the second COT or the third COT as the target COT based on an indication of a first signaling sent by the base station.

4. The HARQ feedback method according to claim 1, wherein taking the second COT or the third COT as the target COT comprises:

taking the second COT or the third COT as the target COT based on predefined setting.

5. The HARQ feedback method according to claim 1, wherein taking the second COT or the third COT as the target COT comprises:

taking the second COT or the third COT as the target COT according to an indication of target downlink control information (DCI) sent by the base station, wherein the target DCI is DCI for scheduling the target PDSCH.

6. The HARQ feedback method according to claim 5, wherein taking the second COT or the third COT as the target COT according to the indication of the target downlink control information (DCI) sent by the base station comprises:

determining, in response to a second signaling sent by the base station, that the target DCI is allowed to indicate an association relationship between the target time domain position and the target COT, and then taking the second COT or the third COT as the target COT according to an indication of the target DCI.

7. The HARQ feedback method according to claim 5, wherein the target PDSCH is a semi-continuously scheduled PDSCH, and the target DCI is configured to activate the semi-continuously scheduled PDSCH.

8. A non-transitory computer readable storage medium, storing a computer program, wherein the computer program, when being executed, is configured to:

obtain a first determination result by determining whether a target time domain position for sending HARQ feedback information is located within a first channel occupancy time (COT) where a target physical downlink shared channel (PDSCH) transmitted by a base station is located, wherein the HARQ feedback information is HARQ feedback information corresponding to the target PDSCH; and determine a target COT associated with the target time domain position based on the first determination result;

wherein the computer program, when being executed, is further configured to:

take, in response to the first determination result indicating that the target time domain position is located behind an ending time domain position of the first COT, a second COT or a third COT as the target COT, wherein the second COT is obtained based on a frame-based equipment (FBE) parameter corresponding to downlink transmission of the base station, and the third COT is obtained based on an FBE parameter corresponding to uplink transmission of a terminal, and the second COT and the third COT overlap at the target time domain position; and take, in response to determining that a starting time of the target time domain position is the same as a starting time domain position of the third COT, the third COT as the target COT, or otherwise take the second COT as the target COT.

9. A hybrid automatic repeat request (HARQ) feedback device, comprising:

a processor; and a memory configured to store executable instructions of the processor, wherein the processor, when executing the instructions, is configured to:

obtain a first determination result by determining whether a target time domain position for sending HARQ feedback information is located within a first channel occupancy time (COT) where a target physical downlink shared channel (PDSCH) transmitted by a base station is located, wherein the HARQ feedback information is HARQ feedback information corresponding to the target PDSCH; and determine a target COT associated with the target time domain position based on the first determination result;

wherein the processor is further configured to:

take, in response to the first determination result indicating that the target time domain position is located behind an ending time domain position of the first COT, a second COT or a third COT as the target COT, wherein the second COT is obtained based on a frame-based equipment (FBE) parameter corresponding to downlink transmission of the base station, and the third COT is obtained based on an FBE parameter corresponding to uplink transmission of a terminal, and the second COT and the third COT overlap at the target time domain position; and take, in response to determining that a starting time of the target time domain position is the same as a starting time domain position of the third COT, the third COT as the target COT, or otherwise take the second COT as the target COT.

10. The HARQ feedback device according to claim 9, wherein the processor is further configured to:

take, in response to the first determination result indicating that the target time domain position is located within the first COT, the first COT as the target COT.

11. The HARQ feedback device according to claim 9, wherein the processor is further configured to:

take the second COT or the third COT as the target COT based on an indication of a first signaling sent by the base station.

12. The HARQ feedback device according to claim 9, wherein the processor is further configured to:

take the second COT or the third COT as the target COT based on predefined setting.

13. The HARQ feedback device according to claim 9, wherein the processor is further configured to:

take the second COT or the third COT as the target COT according to an indication of target downlink control information (DCI) sent by the base station, wherein the target DCI is DCI for scheduling the target PDSCH.

14. The HARQ feedback device according to claim 13, wherein the processor is further configured to:

determine, in response to a second signaling sent by the base station, that the target DCI is allowed to indicate an association relationship between the target time domain position and the target COT, and then taking the second COT or the third COT as the target COT according to an indication of the target DCI.

15. The HARQ feedback device according to claim 13, wherein the target PDSCH is a semi-continuously scheduled PDSCH, and the target DCI is configured to activate the semi-continuously scheduled PDSCH.

* * * * *